United States Patent [19]

Braud et al.

[11] Patent Number: 4,578,011
[45] Date of Patent: Mar. 25, 1986

[54] DEVICE FOR CHARGING STEEL PRODUCTS IN A REHEATING OR TREATMENT FURNACE

[75] Inventors: Yves Braud, Maurepas; Jean Fromentin, Paris, both of France

[73] Assignee: Stein Heurtey Ste Anonyme, Ros Orangis, France

[21] Appl. No.: 611,402

[22] Filed: May 17, 1984

[30] Foreign Application Priority Data

May 18, 1983 [FR] France ................................ 83 08656

[51] Int. Cl.$^4$ ................................................ F27B 9/14
[52] U.S. Cl. .................................... 414/152; 198/436; 414/158; 414/159
[58] Field of Search ............... 414/152, 153, 156, 159, 414/173, 198; 198/360, 361, 367, 369, 372, 436, 457, 597, 782, 787

[56] References Cited

U.S. PATENT DOCUMENTS 3,502,234  3/1970  Cook ................................... 414/156
4,039,072  8/1977  Keller et al. ..................... 198/436 X

*Primary Examiner*—Robert G. Sheridan
*Attorney, Agent, or Firm*—Karl F. Ross; Herbert Dubno

[57] ABSTRACT

A treatment furnace having a longitudinally extending charging opening has a transversely extending furnace conveyor having an upstream end in the vicinity of the opening. A loading conveyor has an array of transversely extending approach rollers adjacent the charging opening so that a workpiece to be treated in the furnace can be rolled longitudinally along the approach rollers to a position transversely aligned with the charging opening. A loading apparatus for the furnace has at least two transversely extending arms each having an inner end pivoted inside the furnace about a longitudinal axis at the upstream end of the furnace conveyor and an outer end outside the furnace and an array of longitudinally extending loading rollers rotatable about horizontal and longitudinal axes is carried on the arms. The outer arm ends can be raised to move the loading rollers carried thereby from a lower position with the loading rollers below the approach rollers to an upper position with the loading rollers above the approach rollers so that a workpiece transversely aligned with the charging opening can move longitudinally on the approach rollers in the lower position of the arms and can move transversely on the loading rollers in the upper position, in which latter position it can be pushed through the charging opening into the furnace and onto the upstream end of the furnace conveyor.

3 Claims, 1 Drawing Figure

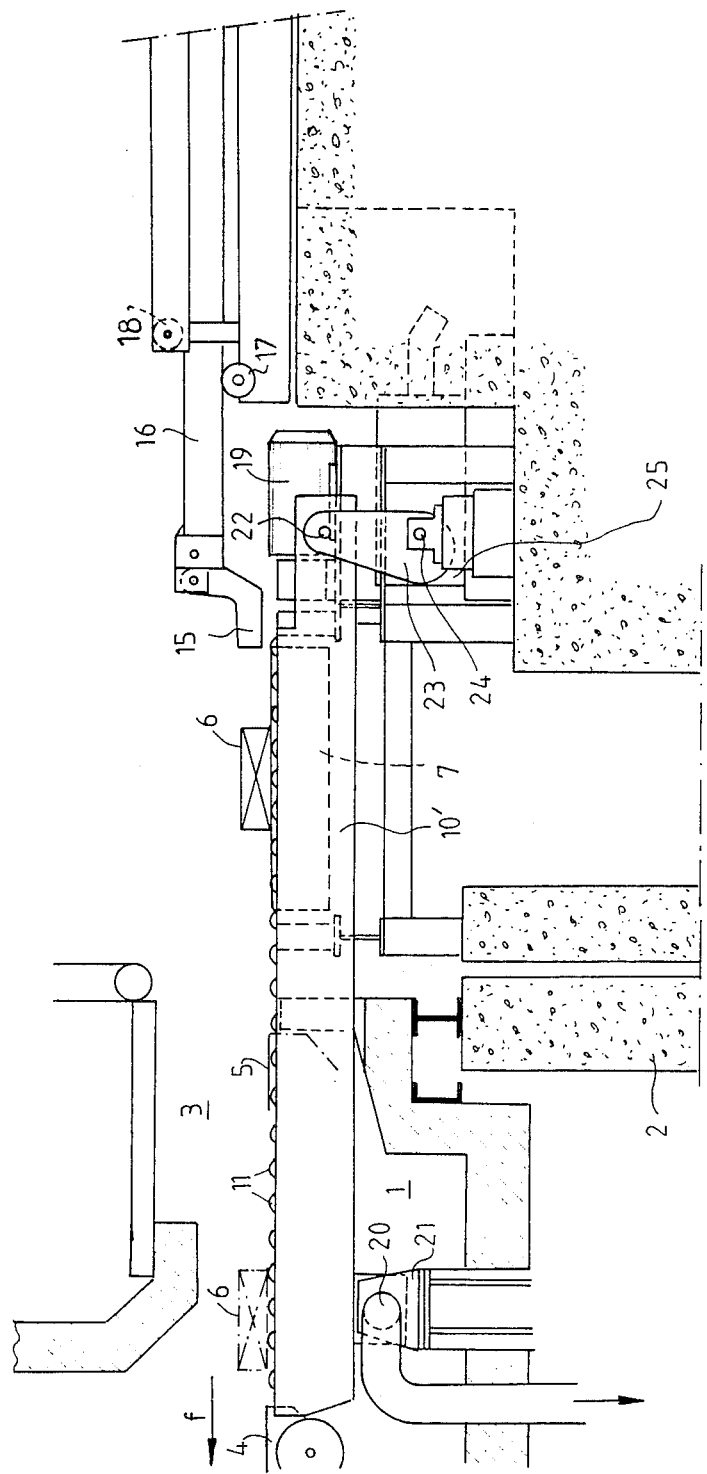

DEVICE FOR CHARGING STEEL PRODUCTS IN A REHEATING OR TREATMENT FURNACE

FIELD OF THE INVENTION

The present invention relates to a device for charging steel products in a reheating or treatment furnace.

BACKGROUND OF THE INVENTION

Introduction of the steel products, such as slabs, into reheating or treatment furnaces is generally ensured by means adapted to push the products inside the furnace from a roller gear bed on which these products are conveyed. The products are most often pushed on slide rails which are disposed between the rollers.

However, during their thrust, the lower face of the steel products rubs on the approach rollers and on the rails, which marks this lower face. Furthermore, the thrust effort is considerable and requires high-power mechanical drive equipment.

U.S. Pat. No. 2,360,661 describes a device for charging slabs or other steel products into a reheating or treatment furnace, which comprises an approach roller gear bed extending along the charging opening of the furnace, means for pushing the products inside the furnace from the roller gear bed, and arms which extend between the approach rollers, themselves bear rollers with axes parallel to the charging opening, and are articulated with respect to the structure of the furnace, outside said furnace.

The arms are retracted when a slab arrives on the approach rollers in front of the charging opening. The arms are then raised so that the slab is supported by the rollers of these arms, which enables it to be pushed without friction towards the position required by the conveyor of the furnace.

However, the presence of the articulation outside the furnace involves a considerable overhang, which renders operation delicate due to the weight of the slabs.

BRIEF SUMMARY OF THE INVENTION

It is an object of the present invention to provide a device for charging steel products of the above type, which is so improved as to overcome the drawback set forth hereinabove.

This device is characterized in that the arms are mounted to pivot about an articulation located inside the furnace.

BRIEF DESCRIPTION OF THE DRAWINGS

The invention will be more readily understood on reading the following description with reference to the accompanying drawings, in which:

The single FIGURE schematically shows the embodiment of the charging device according to the invention.

PARTICULAR DESCRIPTION OF THE DRAWINGS

Referring now to the drawing, it shows a furnace 1 which rests on masonry 2, and is provided with a charging opening 3. It comprises fixed elongated elements 4 adapted to cooperate with mobile elongated conveyor elements for transporting products or workpieces 6 in the transverse direction indicated by arrow f.

Along the charging opening 3 are disposed approach rollers 7 on which the products 6 arrive and which are each driven in rotation by its own motor 19. The axes of these rollers are parallel to the longitudinal axis of the furnace.

Between the rollers 7 are located arms 10' which are themselves provided with small loading rollers 11 with axes perpendicular to those of rollers 7, therefore parallel to the opening 3, and extending inside the furnace 1 up to longitudinal elements 4. Each of the arms 10' is mounted to pivot at its inner end at 20 on a support 21 placed inside the furnace 1 and cooled by circulation of water. The end of the arm 10' located outside the furnace is articulated at 22 on one of the ends of a connecting rod 23 in the other end of which is pivotally mounted an eccentric which is fixed on the driven shaft 24 of a hydraulic motor 25.

In front of rollers 7 is provided a pusher arm 15 which extends in a direction perpendicular to the axes of these rollers and has a length almost equal to that of the charging opening 3. This arm is carried by horizontal elongated elements 16 which are mobile, being guided by rollers 17 and 18 and may be displaced by jacks (not shown).

When the outer end of each of the arms 10' is in low position, these arms 10' are retracted, i.e. the upper edges of rollers 11 located between rollers 7 lie below the horizontal plane in which the upper edges of the rollers 7 lie. Under these conditions, a product 6, constituted for example by a slab, may be guided over rollers 7 to the charging opening of the furnace.

The shaft 24 is then pivoted. The outer end of the arms 10' rises and the rollers 11 raise the slab 6. The jacks controlling the crosspiece 15 are then actuated so that its crosspiece pushes the slab 6 over rollers 11 and guides it over the fixed longitudinal elements 4.

We claim:
1. In combination with:
   a treatment furnace having a longitudinally and horizontally extending charging opening;
   a horizontally and transversely extending furnace conveyor in the furnace and having an upstream end in the vicinity of the charging opening; and
   a loading conveyor including a longitudinally extending array of transversely extending approach rollers adjacent the charging opening, whereby a workpiece to be treated in the furnace can be rolled longitudinally along the approach rollers to a position transversely aligned with the charging opening,
   a loading apparatus including:
   at least two transversely extending arms each having an inner end pivoted inside the furnace about a longitudinal axis at the upstream end of the furnace conveyor and an outer end outside the furnace, the arms extending through the charging opening and between the approach rollers;
   an array of longitudinally extending loading rollers rotatable about horizontal and longitudinal axes on the arms;
   means for raising the outer ends of the arms and thereby pivoting the arms and the loading rollers carried thereby from a lower position with the loading rollers below the approach rollers to an upper position with the loading rollers above the approach rollers, whereby a longitudinally extending workpiece in transverse alignment with the charging opening is supported for longitudinal movement on the approach rollers in the lower position of the arms and is supported for transverse movement on the loading rollers in the upper position of the arms; and means for transversely pushing a workpiece supported on the loading rollers outside the furnace through the charging opening into the furnace and onto the upstream end of the furnace conveyor.

2. The combination defined in claim 1 wherein the array of loading rollers extends between the ends of the arms from outside the furnace through the charging opening into the furnace.

3. The combination defined in claim 1 wherein the furnace conveyor comprises a fixed elements extending transversely in the furnace and movable elements also extending longitudinally in the furnace.

* * * * *